US010909339B2

(12) United States Patent
Rietzler

(10) Patent No.: US 10,909,339 B2
(45) Date of Patent: Feb. 2, 2021

(54) METHOD FOR DETECTING OBJECTS

(71) Applicant: Manfred Rietzler, Marktoberdorf (DE)

(72) Inventor: Manfred Rietzler, Marktoberdorf (DE)

(*) Notice: Subject to any disclaimer, the term of this patent is extended or adjusted under 35 U.S.C. 154(b) by 0 days.

(21) Appl. No.: 16/078,194

(22) PCT Filed: Mar. 23, 2017

(86) PCT No.: PCT/IB2017/000297
§ 371 (c)(1),
(2) Date: Aug. 21, 2018

(87) PCT Pub. No.: WO2017/163123
PCT Pub. Date: Sep. 28, 2017

(65) Prior Publication Data
US 2019/0057230 A1  Feb. 21, 2019

(30) Foreign Application Priority Data
Mar. 24, 2016  (DE) .................. 10 2016 003 488

(51) Int. Cl.
*G06K 7/10* (2006.01)
*G06K 19/07* (2006.01)

(52) U.S. Cl.
CPC ..... *G06K 7/10376* (2013.01); *G06K 7/10475* (2013.01); *G06K 19/0723* (2013.01)

(58) Field of Classification Search
CPC ...... G06Q 10/08; G06Q 10/087; G06Q 10/06; G06Q 20/203; G06Q 50/28; G08B 13/2462; G06K 19/0723; G06K 7/10386
See application file for complete search history.

(56) References Cited

U.S. PATENT DOCUMENTS 7,812,719 B2 * 10/2010 Djuric ................ G08B 21/0275
340/539.13
8,258,953 B2 *  9/2012 Stern .................... G06K 7/0008
340/10.1

(Continued)

FOREIGN PATENT DOCUMENTS

DE   102010020941 A1  11/2011  ............. G06K 19/73
WO   WO2014135217 A1   9/2014  ............. G06K 7/00
WO   WO2015155809 A1  10/2015  ............. G06K 7/00

OTHER PUBLICATIONS

The Notification Concerning Transmittal of International Preliminary Report on Patentability (Chapter I of the Patent Cooperation Treaty), in English, dated Oct. 4, 2018, which was issued by the International Bureau of WIPO in Applicant's corresponding international PCT application having Serial No. PCT/IB2017/000297, filed on Mar. 23, 2017.

(Continued)

*Primary Examiner* — Christopher Stanford
(74) *Attorney, Agent, or Firm* — Bodner & O'Rourke, LLP; Gerald T. Bodner; Christian P. Bodner

(57) ABSTRACT

The invention relates to a method for detecting objects, comprising a plurality of RFID data carriers (DT1-DT9) designed as tags, one data carrier being assigned to each object and the data carriers forming an RFID data carrier population with a random distribution of the RFID data carriers in a data carrier vicinity and at least one mobile read device (R1-R5). The read device, in an active operating mode, moves between at least two different positions in the data carrier vicinity and receives object data or position data of the RFID data carriers that are within range of the read device, such that a data carrier association is made in the read device, in accordance with the position of the latter, between an RFID data carrier and the read device and an object data record or position data record is created and then (Continued)

Figure 1:
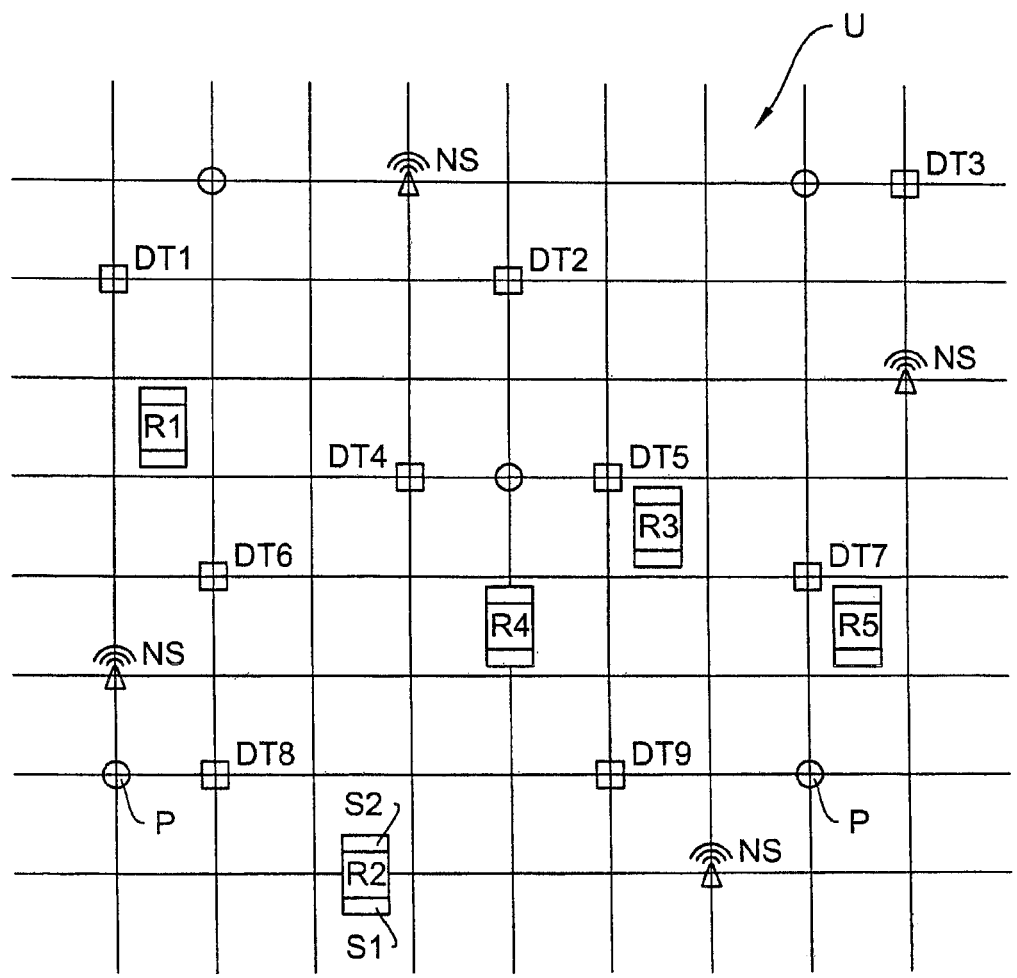

said object data record or position data record is transmitted to a network interface (NS) within transmission range of the read device.

16 Claims, 3 Drawing Sheets

(56) References Cited

U.S. PATENT DOCUMENTS

| | | | | |
|---|---|---|---|---|
| 2005/0052281 A1* | 3/2005 | Bann | ................ | B66F 9/0755 340/539.13 |
| 2005/0197121 A1* | 9/2005 | Fujiwara | ............... | H04W 60/00 455/435.1 |
| 2006/0023679 A1* | 2/2006 | Twitchell, Jr. | ........... | H04Q 9/00 370/338 |
| 2006/0055530 A1* | 3/2006 | Wang | ................ | G01S 5/0018 340/539.13 |
| 2006/0055552 A1* | 3/2006 | Chung | ................ | B60R 25/00 340/686.1 |
| 2006/0145815 A1* | 7/2006 | Lanzieri | ................ | G06K 17/00 340/10.2 |
| 2008/0284600 A1* | 11/2008 | Drzaic | ................ | A62B 99/00 340/572.1 |
| 2009/0243855 A1* | 10/2009 | Prokopuk | ............ | G01S 13/825 340/572.1 |
| 2010/0148985 A1* | 6/2010 | Lin | ................ | G06K 7/10356 340/8.1 |
| 2013/0194077 A1 | 8/2013 | Vargas et al. | ................ | 340/10.6 |

OTHER PUBLICATIONS

The English translation of the International Preliminary Report on Patentability (Chapter I of the Patent Cooperation Treaty), dated Sep. 25, 2018, which was issued by the International Bureau of WIPO in Applicant's corresponding international PCT application having Serial No. PCT/IB2017/000297, filed on Mar. 23, 2017.

The Written Opinion of the International Searching Authority, in English, dated Aug. 16, 2017, which was issued by the International Bureau of WIPO in Applicant's corresponding international PCT application having Serial No. PCT/IB2017/000297, filed on Mar. 23, 2017.

The International Search Report, in English, dated Aug. 16, 2017, which was issued by the International Bureau of WIPO in Applicant's corresponding international PCT application having Serial No. PCT/IB2017/000297, filed on Mar. 23, 2017.

* cited by examiner

METHOD FOR DETECTING OBJECTS

The invention pertains to a method for detecting objects using a plurality of RFID data carriers DT, in particular being designed as a tag, the RFID data carriers each being allocated to one object and the RFID data carriers forming a population of RFID-data carriers being distributed arbitrarily in an data carrier environment U and using a mobile reader, the mobile reader having a first interface for establishing a first data connection with the RFID data carrier, the first interface being designed to receive object data or position data being stored on the RFID data carrier, and the mobile reader having a second interface for establishing a second data connection with at least one network interface and for contactless transfer of an object data set or a position data set to the network interface, wherein the network interface serves to establish a network data connection to a network data server, wherein the mobile reader being in an active mode receives object data or position data of one or several RFID data carriers during a movement performed along any route between to different positions within the data carrier environment and the mobile reader being within the range of the one or several RFID data carriers, such that dependent on the position of the mobile reader there is performed an allocation of a RFID data carrier to the mobile reader thereby creating an object data set or a position data set, the object data set or a position data set respectively comprising the object data or position data and a mobile reader identification, and such that subsequently a transfer of the object data or the position data to the network interface being within the transmission range of the mobile reader device is performed, wherein the data carrier allocation between a RFID data carrier and the mobile reader is changing and thus the object data set or the position data set is changing dependent on the position of the mobile reader.

Corresponding to common practice objects are provided with RFID data carriers for identification, the RFID data carriers regularly being attached to the objects embodied as tags.

Beyond their quality to be a means for identification the RFID data carriers generally serve as information medium for example comprising data for defining special characteristics of the objects or comprising data for allocating the objects, particularly details referring to the producer or the owner of the objects.

In order to read or record the object data stored on the RFID data carriers as common options it is known that an operator positions a handheld reader in a reading position in front of each RFID data carrier and to repeat triggering the reader for each read operation in order to read the RFID data carrier one by one, or to use stationary readers regularly being embodied as overhead reader devices being mounted at the ceiling, wherein caused by the short transmission range of the RFID data carriers there is need for a plurality of reader devices being arranged in a pattern in order to make sure that all RFID data carriers of a data carrier population will be detected.

Thus the known options either cause a high personal demand or high installation effort each linked to corresponding costs.

Hence, the object of the present invention is to provide for a more cost-effective method for detecting objects.

To attain this object the invention has the features of claim 1.

With the method according to the invention there is used at least one mobile reader having a first interface for establishing a first data connection with the RFID data carrier, the first interface being designed to receive object data or position data being stored on the RFID data carrier, and the mobile reader having a second interface for establishing a second data connection with at least one network interface and for contactless transfer of an object data set or a position data set to the network interface, wherein the network interface serves to establish a network data connection to a network data server, wherein the mobile reader being in an active mode and as long as the mobile reader being within the transmission range of the RFID data carrier receives object data or position data of one or several RFID data carriers during a movement performed along any route between to different positions within the data carrier environment U and the mobile reader being within the range of the one or several RFID data carriers, such that dependent on the position of the mobile reader there is performed an allocation of a RFID data carrier DT to the mobile reader thereby creating an object data set or a position data set, the object data set or a position data set respectively comprising the object data or position data and a mobile reader identification, and such that subsequently a transfer of the object data or the position data to the network interface being within the transmission range of the mobile reader is performed, wherein the data carrier allocation between a RFID data carrier and the mobile reader is changing and thus the object data set or the position data set is changing dependent on the position of the mobile reader.

The objects being detected by the method according the invention apart from things can be living beings, particularly people.

The method according the invention uses a mobile wireless reader without need for being activated individually but is in an active mode permanently such that preferably there is created an object data set or a position data set as soon as the mobile reader enters the range of a RFID data carrier.

Preferably a plurality of mobile readers is used with the method according the invention and the RFID data carrier are stationary.

For example people who are just present within the RFID data carrier population can be equipped with such mobile readers. The mobile readers for example being embodied as wearable devices, such that the people must not practice active data recording but can pursue a totally different activity and in doing so act as mobile carriers of the reader devices, particularly the people must not activate the reader devices for any read operation.

According a favorable embodiment of the invention there is used a plurality of mobile readers, wherein particularly when using readers having a limited range a sufficient number of readers is moved within the data carrier population, in order to make sure that with sufficient probability during the route of the readers there will be created object data sets or position data sets allocated to preferably all of the RFID data carriers.

If as to readers having limited range there is provided for multiple network interfaces, such that the allocation between a mobile reader and a network interface varies dependent on the route taken by the mobile reader, it is possible to enhance the quality of data transfer to a network server or to enhance the transfer rate, thus the number of object data sets or position data sets being transferred to a network interface per time unit are enhanced.

It is preferred to store the object data sets or the position data sets before transmission to the network interface in a buffer of the mobile reader, such that it is possible to transfer the object data sets or the position data sets to a network interface with delay as soon as there is a data connection to a network interface.

Preferably the transfer of the object data sets or the position data sets to the network interface NS is performed within defined time periods, such that the transfer rate is limited even if the data connection to a network interface is permanently established. During the brake in the read operation caused by the time periods it is particularly possible to inactivate the high frequency power circuits for saving energy.

As to a subsequent effective evaluation of the object data sets in a network server it is particularly favorable if the object data sets or position data sets created in a mobile reader are processed in the reader device before being transferred to the network interface such that only one object data set or position data set is transferred to the network interface and thus the data volume can be reduced with respect to a subsequent evaluation, as for example in the case that caused by the route taken by the mobile reader there are existing redundant data sets relating to one and the same RFID data carrier, as for example if the mobile reader firstly will pass the RFID data carrier in a first direction and subsequently in a second.

If a processing of the object data sets or the position data sets is performed by the network server, such that redundant object data sets or position data sets relating to the same RFID data carrier and being transferred by different mobile readers are filtered out, the volume of data can be reduced before a subsequent evaluation.

Particularly if one and the same mobile reader is used to read object data sets or position data sets from different positions of the mobile reader those data sets can be superposed in order to enhance the precision.

As to a particularly favorable embodiment of the invention for position determination of the RFID data carriers the RFID data carrier population is provided with RFID position data carriers, which RFID position data carriers being arranged in a defined distribution within the data carrier population and which RFID position data carriers each having a position data set or a reference identification, which position data set being linked to the object data set of the mobile reader. Instead of adding position RFID data carriers to the RFID data carrier it is possible to replace the RFID data carrier by position RFID data carriers.

In order to provide for a position determination it is possible to provide the reader devices with an external tracking system, wherein a position data set is linked to an object data set in the reader device.

If the object data set or the position data set is linked in the mobile reader to a time parameter in case of a non-stationary RFID data carrier it is possible to create a motion profile of the RFID carrier and the object being provided with the RFID carrier respectively.

If the object data set or the position data set is linked in the mobile reader to an environmental parameter, it is possible to create an environmental profile of the RFID carrier and the object being provided with the RFID carrier respectively.

Preferably the object data set is linked in the mobile reader to a signal strength parameter, thus providing for a position determination of the RFID data carrier via triangulation by using redundant object data sets of that RFID data carrier.

Generally it is possible to use as mobile readers any mobile devices being equipped with the relevant interfaces. It is particularly favorable if devices are used anyway being carried by a person and being individually allocated to that person like "personal devices", so that it is not necessary to provide for a special technical equipment of the person serving as mobile carrier. Thus it is possible, to arrange an infrastructure of devices for "crowd reading", wherein a particular favorable option to realize "crowd reading" is using mobiles having relevant interfaces as reader devices.

Recently mobiles with HF-RFID-interfaces are already used which however caused by the HF-technology only offer a limited range for receiving object data or position data from an RFID data carrier. Using UHF-RFID-interfaces in combination with relevant UHF-RFID-data carriers provide for transmission ranges up to the region of 10 m, so that a density of people present during a usual public traffic of persons being equipped with relevant personal devices is sufficient to reach a ratio between the number of reader devices and the range of the RFID data carriers to achieve an exhaustive detection of objects for example being offered in a department store.

If the network server is embodied as a lower server of a vertical server cluster which server cluster comprising at least one upper server, the lower server can be used to define the scope of data access from the upper server to the lower server, so that on one hand direct data access from the upper server to the RFID data carrier is not possible and on the other hand it can be determined which object data of the object data set stored on the lower server can be accessed from the upper server, particularly such that only the lower server of the server cluster provides for a data access on a data store comprising all object data sets or object data of the object data sets and there is only a data transfer of a definite part of a data volume from the data store of the lower server to the data store of the upper server.

Figure 2:
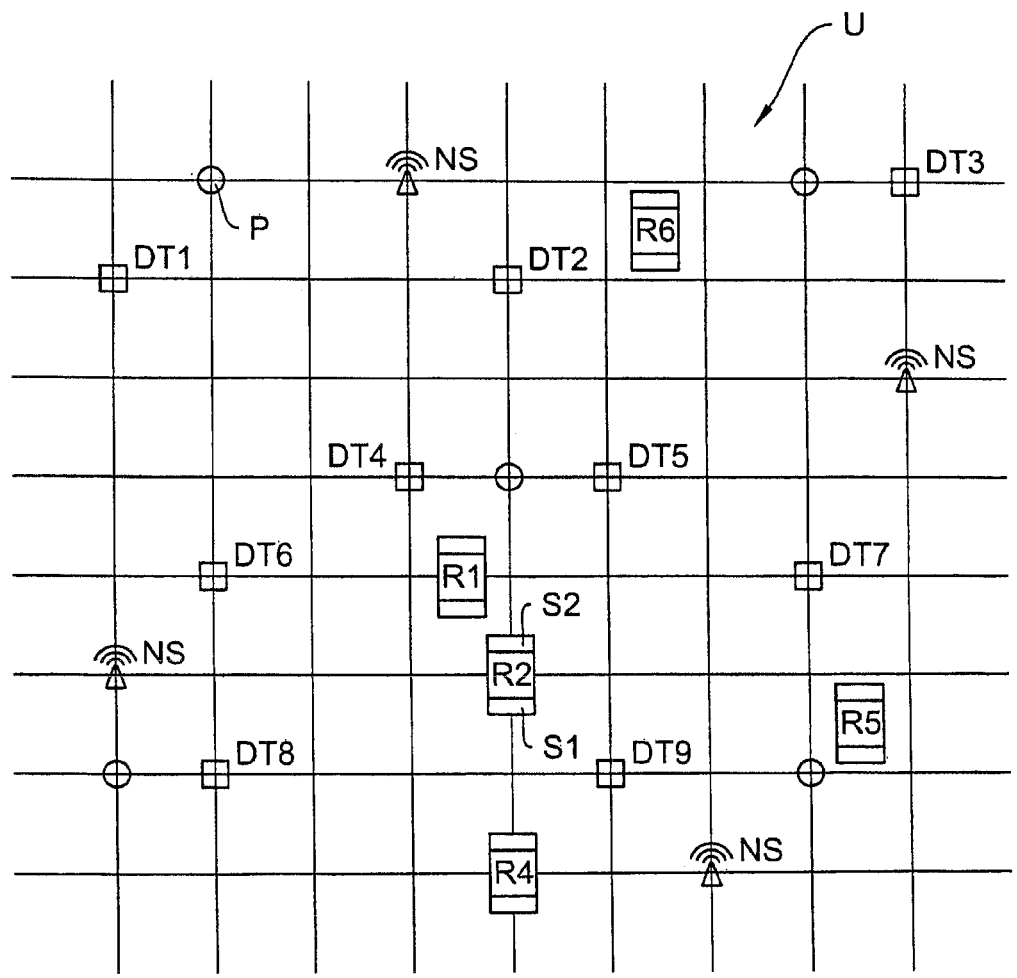
Figure 3:
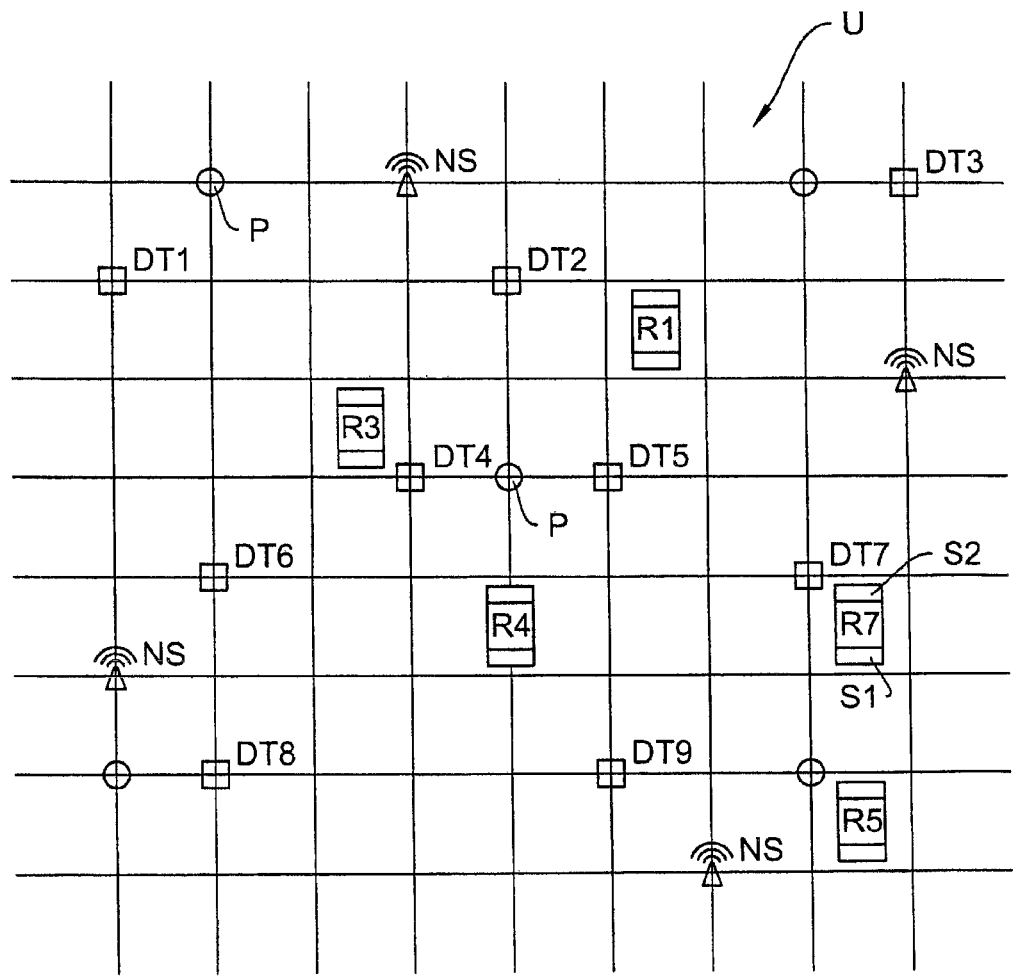

Hereinafter a possible version of the inventive method is illustrated with reference to the drawings showing in FIG. 1: a schematic illustration of a RFID data carrier population with a first snapshot of the motion of reader devices being moved independently of each other;

FIG. 2: a subsequent second snapshot of the motion of the reader devices;

FIG. 3 a subsequent third snapshot of the motion of the reader devices.

FIGS. 1 to 3 show positions of seven readers, which reader devices each having reached within a data carrier population U at different points of motion. The data carrier population shown U in FIG. 1 to 3 comprising RFID data carriers DT1 to DT9 being in a definite distribution, which RFID data carriers DT1 to DT9 are positioned stationary and for better illustration are here positioned at grid points of a distribution pattern, wherein in the following it should be assumed, that the transmission range of the RFID data carriers DT1 to DT9 covers two grid fields, such that for example at the point shown in FIG. 1 the reader devices R1 to R5 are positioned within the data carrier population U, wherein R1 is within the range of data carriers DT1 and DT6, R2 is in the range of data carrier DT8, R3 is within the range of DT5 and DT7 and R5 is in the range of DT7; but the object data of data carrier DT9 cannot be received by any reader device.

Thus during the shown snapshot object data are transferred from RFID data carrier DT8 to reader device R2, whereas caused by the non sufficient range no object data are transferred from RFID data carrier DT9 to reader device R2.

The range of reader devices R1 to R7 for transferring object data to the network interfaces covers three grid fields as shown in the snapshots.

In the present case, beyond that network interfaces NS1 to NS4 as well are stationay installed at grid points within the RFID data carrier population U, which network interfaces NS1 to NS4 provide for a wireless data connection to a network server not shown. The data connection between network interfaces NS1 to NS4 for example can be established as WLAN connection.

The reader devices R1 to R5 each have a first interface S1 for connection with the RFID data carriers, which first interface S1 is embodied as UHF interface like the interface of the RFID data carriers and each have a second interface, which can be embodied like the network interface as a WLAN interface. For the sake of illustration of the method in the following it should be assumed, that the range of the WLAN connection between the reader devices R1 to R5 and the network interfaces in each case covers three grid fields.

In the case of the shown embodiment of the method, beyond that the RFID data carrier population U comprising the RFID data carriers DT1 to DT5 containing the object data of the objects, for example objects of sale, being provided with the respective RFID data carriers, is supplemented with RFID position data carriers P providing for positioning of the RFID data carriers.

The snapshot of the motion of the mobile reader devices R1 to R5 demonstrated in FIG. 1 shows the reader devices R1 to R5 in a temporary arrangement in which the reader devices R1 to R5 are positioned within the data carrier population U such that R1 receives object data from DT1 and DT6, R2 receives object data from DT8, R3 receives object data from DT5 and DT7, R5 receives object data from DT7, but R4 does not receive any object data. Because of the distribution of the reader devices R1 to R5 a transmission of object data to the network interfaces NS can only be performed by R1, R2, and R5, since R3 not being present close enough to a network interface NS and at the time demonstrated R4 being out of the range of an RFID data carrier.

FIG. 2 demonstrate a distribution of the reader devices R1, R2, R4, R5 and R6 which distribution has changed because of an intermediate motion of the reader devices, wherein R3 intermediately is not present anymore within the data carrier population U and instead the reader device R6 has entered into the data carrier population U. In the demonstrated distribution the reader device R1 receives object data from DT4 and DT5, R2 receives object data from DT9, R4 receives object data from DT9, R5 receives object data from DT7, and R6 receives object data from DT2. Because of the distribution of the reader devices R1, R2, R4, R5 and R6 a transmission of object data to the network interfaces NS can only performed by reader devices R2, R4, R5 and R6, since R1 not being present close enough to a network interface NS.

FIG. 3 demonstrate a distribution of the reader devices R1, R3, R4, R5 and R7 which distribution has changed because of a further intermediate motion of the reader devices, wherein R2 and R6 intermediately are not present anymore within the data carrier population U and instead the reader device R7 has entered into the data carrier population U. In the demonstrated distribution the reader device R1 receives object data from DT2 and DT5, R3 receives object data from DT4, and R7 receives object data from DT7. Because of the distribution of the reader devices R1, R3, R4, R5 and R7 a transmission of object data to the network interfaces NS can only performed by reader devices R1, R3 and R7.

Derived from a synopsis of the afore illustrated distributions of the reader devices, which distributions are present in successive snapshots of motion profiles of the reader devices, it will be evident, that because of the motion of the reader devices resulting in different relative positions with respect to the RFID data carriers, despite of a limited range of the reader devices there is sufficient a considerably smaller number of reader devices then it would have been the case with a stationary arrangement of reader devices having comparable range.

The invention claimed is:

1. Method for detecting objects using a plurality of radio frequency identification (RFID) data carriers, a mobile reader and at least one network interface, the plurality of RFID data carriers including a plurality of position RFID data carriers and a plurality of object RFID data carriers, each position RFID data carrier of the plurality of position RFID data carriers having position data stored thereon, each object RFID data carrier of the plurality of object RFID data carriers having object data stored thereon, each RFID data carrier of the plurality of RFID data carriers having a transmission range for transmitting one of position data and object data to the mobile reader, the mobile reader having a first interface, a second interface and a transmission range within which one or more of an object data set and a position data set can be transmitted to at least one of the at least one network interface, which comprises the steps of:

allocating each object RFID data carrier of the plurality of object RFID data carriers to a respective object of the objects to be detected, the plurality of object RFID data carriers forming a population of object RFID data carriers which are distributed nonuniformly in a data carrier environment, the mobile reader being movable in the data carrier environment along at least one route between at least two different positions in the data carrier environment, establishing a first data connection with one or more RFID data carriers of the plurality of RFID data carriers utilizing the first interface of the mobile reader, establishing a second data connection with at least one of the at least one network interface that the mobile reader is within transmission range of utilizing the second interface of the mobile reader, establishing a network data connection to a network data server with the network interface, receiving with the first interface of the mobile reader the object data of one or more object RFID data carriers of the plurality of object RFID data carriers the mobile reader is within the transmission range of during a movement of the mobile reader along at least one of the at least one route, receiving with the first interface of the mobile reader the position data of one or more position RFID data carriers of the plurality of position RFID data carriers that the mobile reader is within the transmission range of during movement of the mobile reader along at least one of the at least one route, allocating one or more object RFID data carriers of the plurality of object RFID data carriers to the mobile reader, thereby creating the at least one object data set, the at least one object data set comprising the object data and a mobile reader identification, allocating one or more position RFID data carriers of the plurality of position RFID data carriers to the mobile reader, thereby creating the at least one position data set, the at least one position data set comprising the position data and a mobile reader identification, contactlessly transferring the at least one object data set with the second interface of the mobile reader to at least one of the at least one network interface within the transmission range of the mobile reader,
contactlessly transferring the at least one position data set with the second interface of the mobile reader to at least one of the at least one network interface within the transmission range of the mobile reader,
wherein the data carrier allocation between at least one RFID data carrier of the plurality of RFID data carriers and the mobile reader changes during movement of the mobile reader along the at least one route and thus at least one of the object data set and the position data set changes during movement of the mobile reader along the at least one route, and
wherein mobile phones having relevant interfaces are used as mobile readers.

2. Method according to claim 1,
wherein as to mobile readers having limited transmission range there is provided for multiple network interfaces, such that the allocation between a mobile reader and a network interface varies dependent on the route taken by the mobile reader.

3. Method according to claim 1,
wherein the object data sets or the position data sets before transmission to the network interface are stored in a buffer of the mobile reader.

4. Method according to claim 3,
wherein the transfer of the object data sets or the position data sets to the network interface is performed within defined time periods.

5. Method according to claim 3,
wherein the object data sets or the position data sets each being created in a mobile reader are processed before being transferred to the network interface.

6. Method according to claim 5,
wherein in case of object data sets or position data sets being redundant only one object data set or position data set of each RFID data carrier is transferred to the network interface.

7. Method according to claim 1,
wherein a processing of the object data sets or the position data sets is performed by the network server, such that redundant object data sets or position data sets relating to the same RFID data carrier and being transferred by different mobile readers are filtered out.

8. Method according to claim 1,
wherein for position determination of the object RFID data carriers the population of object RFID data carriers in the data carrier environment is provided with position RFID data carriers, which position RFID data carriers being arranged in a defined distribution within the data carrier population and which position RFID data carriers each having a position data set or a reference identification, which position data set being linked to the object data set of the mobile reader.

9. Method according to claim 1,
wherein the object data set or the position data set is linked in the mobile reader to a time parameter.

10. Method according to claim 1,
wherein the object data set or the position data set is linked in the mobile reader to an environmental parameter.

11. Method according to claim 1,
wherein the object data set or the position data set is linked in the mobile reader to a signal strength parameter data set.

12. Method according to claim 1,
wherein personal devices having relevant interfaces are used as mobile readers.

13. Method according to claim 1,
wherein the network server is embodied as a lower server of a vertically structured server cluster.

14. Method according to claim 13,
wherein only the lower server of the server cluster provides for a data access to a data store comprising the entirety of all object data sets and object data of the object data sets respectively and wherein only a data transfer of a defined partial quantity of the data stored in the data store of the lower server to the data store of the upper server is performed.

15. Method for detecting objects using a plurality of radio frequency identification (RFID) data carriers, a mobile reader and at least one network interface, the plurality of RFID data carriers including a plurality of position RFID data carriers and a plurality of object RFID data carriers, each position RFID data carrier of the plurality of position RFID data carriers having position data stored thereon, each object RFID data carrier of the plurality of object RFID data carriers having object data stored thereon, each RFID data carrier of the plurality of RFID data carriers having a transmission range for transmitting one of position data and object data to the mobile reader, the mobile reader having a first interface, a second interface and a transmission range within which one or more of an object data set and a position data set can be transmitted to at least one of the at least one network interface, which comprises the steps of:
allocating each object RFID data carrier of the plurality of object RFID data carriers to a respective object of the objects to be detected, the plurality of object RFID data carriers forming a population of object RFID data carriers which are distributed nonuniformly in a data carrier environment, the mobile reader being movable in the data carrier environment along at least one route between at least two different positions in the data carrier environment,
establishing a first data connection with one or more RFID data carriers of the plurality of RFID data carriers utilizing the first interface of the mobile reader,
establishing a second data connection with at least one of the at least one network interface that the mobile reader is within transmission range of utilizing the second interface of the mobile reader,
establishing a network data connection to a network data server with the network interface,
receiving with the first interface of the mobile reader the object data of one or more object RFID data carriers of the plurality of object RFID data carriers the mobile reader is within the transmission range of during movement of the mobile reader along at least one of the at least one route,
receiving with the first interface of the mobile reader the position data of one or more position RFID data carriers of the plurality of position RFID data carriers that the mobile reader is within the transmission range of during movement of the mobile reader along at least one of the at least one route,
allocating one or more object RFID data carriers of the plurality of object RFID data carriers to the mobile reader, thereby creating the at least one object data set, the at least one object data set comprising the object data and a mobile reader identification,
allocating one or more position RFID data carriers of the plurality of position RFID data carriers to the mobile reader, thereby creating the at least one position data set, the at least one position data set comprising the position data and a mobile reader identification, contactlessly transferring the at least one object data set with the second interface of the mobile reader to at least one of the at least one network interface within the transmission range of the mobile reader, contactlessly transferring the at least one position data set with the second interface of the mobile reader to at least one of the at least one network interface within the transmission range of the mobile reader, wherein the data carrier allocation between at least one RFID data carrier of the plurality of RFID data carriers and the mobile reader changes during movement of the mobile reader along the at least one route and thus at least one of the object data set and the position data set changes during movement of the mobile reader along the at least one route.

16. Method for detecting objects using a plurality of radio frequency identification (RFID) data carriers, a mobile reader and at least one network interface, the plurality of RFID data carriers including a plurality of position RFID data carriers and a plurality of object RFID data carriers, each position RFID data carrier of the plurality of position RFID data carriers having position data stored thereon, each object RFID data carrier of the plurality of object RFID data carriers having object data stored thereon, each RFID data carrier of the plurality of RFID data carriers having a transmission range for transmitting one of position data and object data to the mobile reader, the mobile reader having a first interface, a second interface and a transmission range within which one or more of an object data set and a position data set can be transmitted to at least one of the at least one network interface, which comprises the steps of:

allocating each object RFID data carrier of the plurality of object RFID data carriers to a respective object of the objects to be detected, the plurality of object RFID data carriers forming a population of object RFID data carriers which are distributed arbitrarily in a data carrier environment, the mobile reader being movable in the data carrier environment along at least one route between at least two different positions in the data carrier environment, establishing a first data connection with one or more RFID data carriers of the plurality of RFID data carriers utilizing the first interface of the mobile reader, establishing a second data connection with at least one of the at least one network interface that the mobile reader is within transmission range of utilizing the second interface of the mobile reader, establishing a network data connection to a network data server with the network interface, receiving with the first interface of the mobile reader the object data of one or more object RFID data carriers of the plurality of object RFID data carriers the mobile reader is within the transmission range of during movement of the mobile reader along at least one of the at least one route, receiving with the first interface of the mobile reader the position data of one or more position RFID data carriers of the plurality of position RFID data carriers that the mobile reader is within the transmission range of during movement of the mobile reader along at least one of the at least one route, allocating one or more object RFID data carriers of the plurality of object RFID data carriers to the mobile reader, thereby creating the at least one object data set, the at least one object data set comprising the object data and a mobile reader identification, allocating one or more position RFID data carriers of the plurality of position RFID data carriers to the mobile reader, thereby creating the at least one position data set, the at least one position data set comprising the position data and a mobile reader identification, contactlessly transferring the at least one object data set with the second interface of the mobile reader to at least one of the at least one network interface within the transmission range of the mobile reader, contactlessly transferring the at least one position data set with the second interface of the mobile reader to at least one of the at least one network interface within the transmission range of the mobile reader, wherein the data carrier allocation between at least one RFID data carrier of the plurality of RFID data carriers and the mobile reader changes during movement of the mobile reader along the at least one route and thus at least one of the object data set and the position data set changes during movement of the mobile reader along the at least one route, and wherein mobile phones having relevant interfaces are used as mobile readers.

\* \* \* \* \*